No. 782,719. PATENTED FEB. 14, 1905.
G. W. BOWEN.
GUANO DISTRIBUTER.
APPLICATION FILED APR. 22, 1904.
2 SHEETS—SHEET 1.
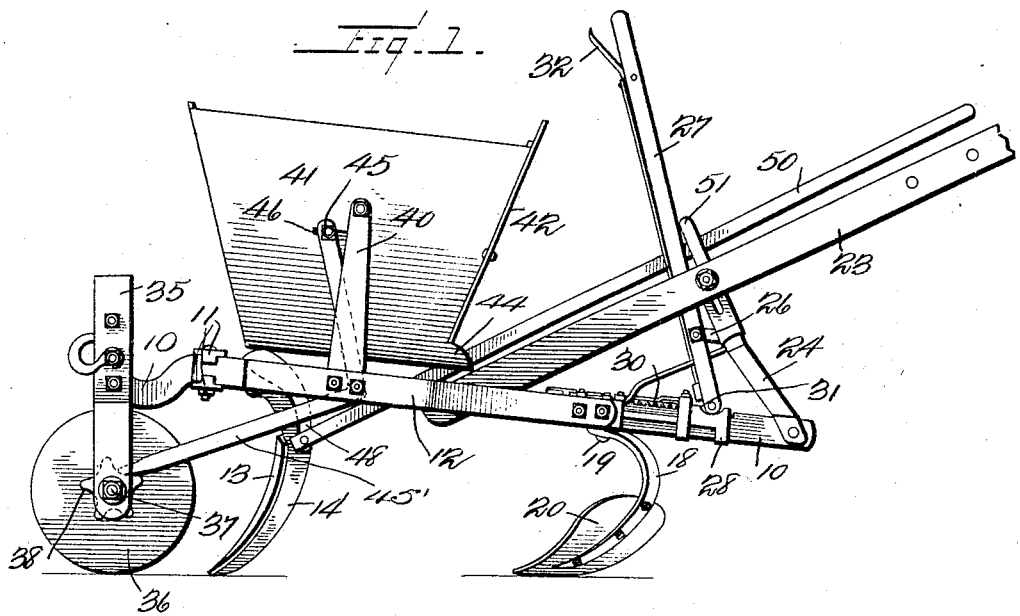
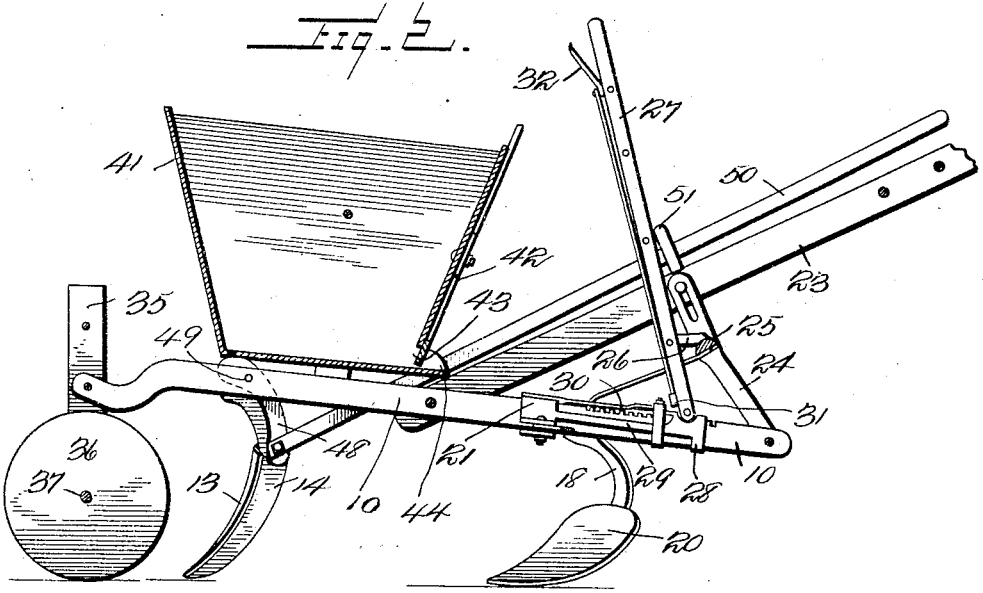
WITNESSES:
INVENTOR
G. W. Bowen
BY
Attorneys

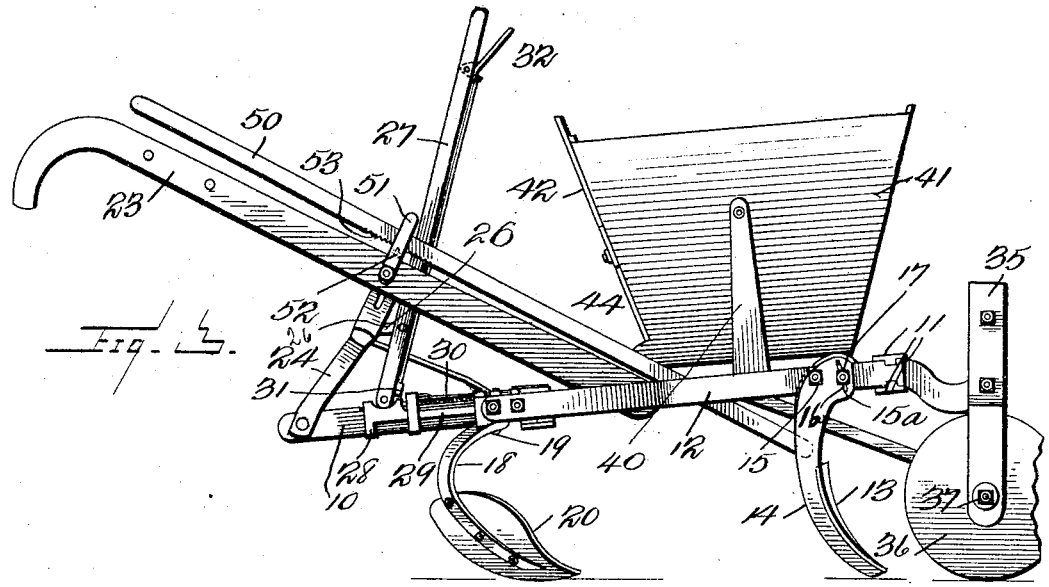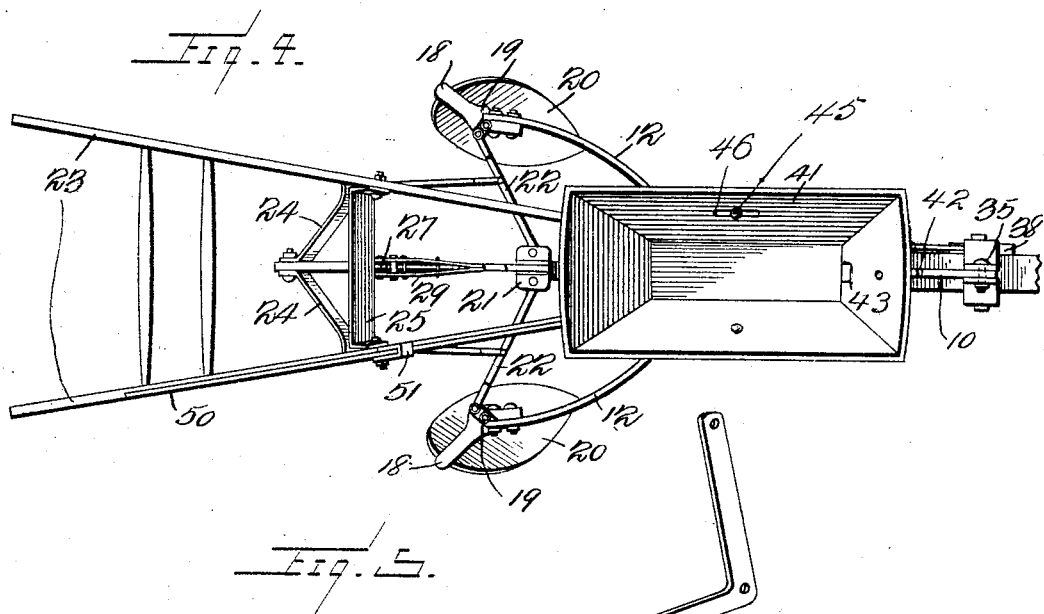

No. 782,719.                                                                 Patented February 14, 1905.

UNITED STATES PATENT OFFICE.

GEORGE WILLIAM BOWEN, OF ADABELLE, GEORGIA.

GUANO-DISTRIBUTER.

SPECIFICATION forming part of Letters Patent No. 782,719, dated February 14, 1905.

Application filed April 22, 1904. Serial No. 204,440.

*To all whom it may concern:*

Be it known that I, GEORGE WILLIAM BOWEN, a citizen of the United States, residing at Adabelle, in the county of Bulloch, State of Georgia, have invented certain new and useful Improvements in Guano-Distributers; and I do hereby declare the following to be a full, clear, and exact description of the invention, such as will enable others skilled in the art to which it appertains to make and use the same.

This invention relates to fertilizer-distributers; and it has for its object to provide a construction wherein the ground will be opened, the fertilizer distributed evenly and in proper quantity in the furrows thus formed, and in which the earth will be returned to cover the fertilizer.

A further object of the invention is to provide a construction wherein the rate of feed of the fertilizer may be adjusted and may be entirely cut off without changing the adjustment, other objects and advantages of the invention being understood from the following description.

In the drawings forming a portion of this specification, and in which like numerals of reference indicate similar parts in the several views, Figure 1 is a side elevation showing an implement embodying the present invention, parts being broken away. Fig. 2 is a vertical section taken longitudinally through the distributer. Fig. 3 is a side elevation. Fig. 4 is a top plan view. Fig. 5 is a detail perspective view showing the striker-wheel and the angular lever operated thereby.

Referring now to the drawings, there is shown a fertilizer-distributer comprising a main bar or beam 10, at the forward end of which are pairs of vertically-spaced laterally-extending ears 11, and between the ears of each pair is pivoted the forward end of an outer beam 12, there being thus three beams disposed side by side.

In connection with the beam 12 at the right-hand side of the implement is employed a shovel 13, secured to a standard 14, the upper end of which is bifurcated and straddles the beam to which it is pivoted. The standard is curved and extends forwardly from its pivot 15, the forward portion being vertically slotted, as shown at 16, to receive the bolt 17, the nut of which may be adjusted into and out of position to clamp the standard against pivotal movement. This arrangement provides for adjustment of the shovel to enter the ground at the proper angle.

At the rear end of each beam 12 is connected the arc-shaped standard 18 through the medium of a bolt 19, passed vertically through the standard and the end of the beam, so that the standard may be adjusted to lie at different angles to the beam and to hold its shovel 20 in different corresponding positions, the shovels 20 being so formed as to engage the loose earth and turn it over onto the fertilizer that has been deposited. Mounted slidably upon the beam 10 is a sleeve 21, to which are pivoted the links 22, which extend at opposite sides of the beam 10 and are pivoted to the rear ends of the beams 12, so that when the sleeve is shifted longitudinally of the beam 10 the links will be moved to force the rear ends of the beams 12 apart or to draw them toward each other. Handles 23 are connected to the beam 10 and extend upwardly and rearwardly therefrom and diverge, and connected to these handles are the braces 24, that are connected to the rear end of the beam 10 and are in turn connected by a cross-piece 25, to which are pivoted links 26, which extend forwardly and have pivoted between them a hand-lever 27, the lower end of which is connected to a second sleeve 28, slidably mounted upon a beam 10 and connected to the sleeve 21 by the rod 29, so that as the hand-lever is shifted the links 22 will be operated to move the rear ends of the beams 12 toward or away from each other. The upper edge of the beam 10 is provided with rack-teeth 30, and a latch-bolt 31, having operating-handles 32, is mounted upon the lever for engagement with these teeth to hold the lever in its different adjusted positions.

The beam 10 extends forwardly beyond the ears 11 and between the plates 35, which are bolted together through the beam, these plates having each a series of perforations that permit of adjustment of them vertically on the beam. The lower ends of the plates 35 receive between them a wheel 36, having an axle 37 journaled in the plates, said axle carrying also a star or striker wheel 38. Upon the beams 12 are mounted the uprights 40, between the upper ends of which is pivotally hung a hopper 41, there being a discharge-opening 43 at the bottom of the rear side of the hopper which is opened and closed by the broadened lower end of a lever 42, which is pivoted upon the back of a hopper for lateral-swinging movement. From the opening 43 extends a discharge-chute 44. An angular rock-lever 45' is pivoted at its angle to one of the side beams 12, and one end thereof is pivotally engaged with a bolt 45, that is engaged through the side of the hopper. The bolt engages a slot 46 in the side of the hopper, along which it may be adjusted to insure proper positions of the hopper as it is swung, as hereinafter described. The opposite end of the angular lever lies in position for engagement by the striker 38, so that as the implement advances the rock-lever will be rocked to swing the hopper, this movement of the hopper serving to shake the fertilizer therefrom.

If the rear side of the hopper be swung upwardly, the fertilizer will cease to pass from the opening 43. To accomplish this result, a cam-lever 48 is pivotally connected with the forward portion of the beam 10 in such position that when the lever is rocked the cam will press against the bottom of the forward portion of the hopper and raise the latter. When the lever is rocked in the opposite direction, the hopper is lowered.

A rod 50 is connected at its forward end to the lower end of the lever 48 and extends rearwardly, above, and alongside of one of the handles 23 and through the arch 51, secured to the latter. Upon the handle within the arch is a knife-edge 52, and the lower edge of the rod 50 is provided with teeth 53, which are adapted to engage the knife-edge in different positions of the rod 50 to hold the latter with the cam-lever at different points of its adjustment.

The uprights between which the hopper is pivoted have sufficient resiliency to maintain the upper ends thereof in close relation to the hopper when the beams 12 are swung outwardly, so that lateral displacement of the hopper is prevented.

Not only does the tilting of the hopper change the ease with which the contents of the hopper may pass through the discharge-opening, but as the hopper is swung the angular lever is swung into and out of position for engagement by the striker.

By swinging the hopper with the cam-lever the angular lever may be swung into such position that it will be given only a slight movement by the striker-wheel and a corresponding slight movement will be given to the hopper.

What is claimed is—

1. An implement of the class described comprising a pivoted hopper, having a discharge-opening disposed for discharge of material therethrough from the hopper when the latter is moved pivotally, a movable striker, a lever connected with the hopper for swinging it and disposed for engagement and operation by the striker, a pivoted cam disposed to engage and move the hopper with the lever away from the striker, and means for holding the cam at different points of its adjustment.

2. An implement of the class described comprising a pivoted hopper having a discharge-opening in one of its ends, means for swinging the hopper and separate means for varying the degree of angular movement of the hopper.

3. An implement of the class described comprising a pivoted hopper having a discharge-opening disposed for discharge of material therethrough from the hopper when the latter is moved pivotally, a movable striker, a lever connected with the hopper for swinging it and disposed for engagement and operation by the striker, and means for moving and holding the hopper with said lever out of position for engagement by the striker.

In testimony whereof I affix my signature in presence of two witnesses.

GEORGE WILLIAM BOWEN.

Witnesses:
JOHN G. MUMM,
W. L. KENNEDY.